US00RE37010E

(19) United States
(12) Reissued Patent
Newmoyer

(10) Patent Number: US RE37,010 E
(45) Date of Reissued Patent: Jan. 9, 2001

(54) COMMUNICATION CABLE FOR USE IN A PLENUM

(75) Inventor: Kerry Newmoyer, Denver, PA (US)

(73) Assignee: Alcatel NA Cable Systems, Inc., Claremont, NC (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/701,396

(22) Filed: Aug. 22, 1996

Related U.S. Patent Documents

Reissue of:
(64) Patent No.: 5,493,071
Issued: Feb. 20, 1996
Appl. No.: 08/337,564
Filed: Nov. 10, 1994

(51) Int. Cl.[7] ..... H01B 11/02
(52) U.S. Cl. ..... 174/113 R; 174/34; 174/110 FC; 174/121 A
(58) Field of Search ..... 174/113 R, 107, 174/121 A, 34, 110 FC

(56) References Cited

U.S. PATENT DOCUMENTS 3,433,890 * 3/1969 Gabriel et al. ..... 174/116
3,489,844 1/1970 Motley ..... 174/32

(List continued on next page.)
5,563,377 10/1996 Arpin et al. .

FOREIGN PATENT DOCUMENTS

0380245 * 8/1990 (EP) .

OTHER PUBLICATIONS

Berk–Tek Product Specification, Drawing Number 230042, Part Number BTTB–24–25D–P/HX, dated Aug. 12, 1987, pp. 1–3.
Essex Group, Inc. Bullentin 2021–0391, Inside Premises Wiring, 1991.
Underwriters Laboratories Inc., File E107869, Project 90ME13368, Report on Communications Cable, Teledyne Thermatics, Elm City, NC, Sep. 25, 1990.
Underwriters Laboratories Inc., File E113333, vol. 1, Sec. 14, Report on a Communication Cable, Issued Jul. 12, 1991, Revised Jan. 17, 1995, pp. 1–2.
Teledyne Thermatics, Elm City, North Carolina, Type 2 Data & Telephone Plenum Cable, Drawing No. 12632/3, dated May 16, 1990, pp. 1–3.
Champlain Cable Corp. News Release, Notice #4, dated Feb. 8, 1990.
Journal of Vinyl Technology, vol. 7, No. 3, Sep. 1985, pp. 107–111.
International Wire & Cable Symposium Proceedings 1987, Reduced Emissions Plenum Cable Jacket Compounds, M. J. Keogh, pp. 592–597.
U.L. Report: File E 57891, vol. 1, Sec. 2, Issued Jan. 3, 1977, Revised Jun. 22, 1992.
U.L. Report: File E 57891, vol. 1, Sec. 3, Issued Feb. 25, 1971, Revised Jun. 22, 1992.
U.L. Report: File E 57891, vol. 1, Sec. 4, Revised Jun. 1, 1989.
Underwriter's Laboratory Standard 910 Paper.

*Primary Examiner*—Hyung-Sub Sough
*Assistant Examiner*—William H Mayo, III
(74) *Attorney, Agent, or Firm*—Ware, Fressola, Van Der Sluys & Adolphson LLP

(57) ABSTRACT

A communication cable includes a plurality of twisted pairs of electrical conductors, each electrical conductor being surrounded by a layer of plenum rated insulation. The cable also includes at least one additional twisted pair of electrical conductors, each electrical conductor thereof being surrounded by a layer of non-plenum rated insulation.

27 Claims, 2 Drawing Sheets

U.S. PATENT DOCUMENTS

| | | | | |
|---|---|---|---|---|
| 3,650,827 | | 3/1972 | Brown et al. | 117/218 |
| 3,678,177 | * | 7/1972 | Lawrenson | 174/113 C |
| 4,408,443 | * | 10/1983 | Brown et al. | 174/34 |
| 4,412,094 | * | 10/1983 | Dougherty et al. | 174/110 |
| 4,423,589 | * | 1/1984 | Hardin et al. | 57/293 |
| 4,446,689 | * | 5/1984 | Hardin et al. | 57/204 |
| 4,500,748 | * | 2/1985 | Klein | 174/121 |
| 4,605,818 | * | 8/1986 | Arroyo et al. | 174/107 |
| 4,687,294 | * | 8/1987 | Angeles | 350/96.23 |
| 4,697,051 | * | 9/1987 | Beggs et al. | 174/34 |
| 4,755,629 | * | 7/1988 | Beggs et al. | 174/34 |
| 4,873,393 | * | 10/1989 | Friesen et al. | 174/34 |
| 4,941,729 | * | 7/1990 | Hardin et al. | 350/96.23 |
| 4,969,706 | * | 11/1990 | Hardin et al. | 350/96.23 |
| 5,001,304 | * | 3/1991 | Hardin et al. | 174/107 |
| 5,010,210 | * | 4/1991 | Sidi et al. | 174/34 |
| 5,024,506 | * | 6/1991 | Hardin et al. | 350/96.23 |
| 5,074,640 | * | 12/1991 | Hardin et al. | 385/109 |
| 5,162,609 | * | 11/1992 | Adriaenssens et al. | 174/34 |
| 5,173,960 | * | 12/1992 | Dickerson | 174/121 A |
| 5,202,946 | * | 4/1993 | Hardin et al. | 385/109 |
| 5,253,317 | * | 10/1993 | Allen et al. | 385/109 |
| 5,298,680 | * | 3/1994 | Kenny | 174/36 |
| 5,378,856 | * | 1/1995 | Allen | 174/121 A |
| 5,424,491 | | 6/1995 | Walling et al. | 174/113 |

* cited by examiner

COMMUNICATION CABLE FOR USE IN A PLENUM

Matter enclosed in heavy brackets [ ] appears in the original patent but forms no part of this reissue specification; matter printed in italics indicates the additions made by reissue.

BACKGROUND OF THE INVENTION

The present invention generally relates to a communication cable for use in a plenum and, in particular, relates to one such communication cable having a first plurality of twisted pairs of electrical conductors having a first insulating material about each electrical conductor thereof and a second plurality of twisted pairs of electrical conductors having a second insulating material about each electrical conductor thereof.

As communications and communication services have increased, it has become necessary to provide communication cables in larger and larger numbers. This is particularly true in office buildings where more and mores communication services are being demanded. Typically, rather than rewire an existing building, it has been found more economical to provide the needed communication services by running the communication cables in plenums. In general, a plenum is defined as a compartment or chamber to which one or more air ducts are connected and which forms part of the air distribution system. Generally, in existing buildings, plenums are readily formed by providing drop ceilings, which is typically a return air plenum, in a facility being rewired. Another alternative is to create a plenum beneath a raised floor of a facility.

From the above it is readily understood why it would be very advantageous to utilized a wiring scheme within these fairly accessible places. However, since these plenums handle environmental air, considerable concern regarding a fire incidence is addressed in the National Electrical Code by requiring that communications cables for use in plenums pass a stringent flame and smoke evaluation. Consequently, in the manufacture of communication cables the fire resistance ratings which allow for installation within certain areas of a building are of primary importance.

Currently, communication cables for use in plenums must meet the requirements of the Underwriter's Laboratory Standard 910 which is a Test Method For Fore and Smoke Characteristics of Cables Used In Air-Handling Spaces. This is a well known test performed in a modified Steiner Tunnel. During the test, a single layer of 24 foot lengths of cable more supported on a one foot wide cable rack which is filled with cables. The cables are ignited with a 300,000 Btu/hr methane flame located at one end of the furnace for a duration of 20 minutes. Flame spread is aided by a 240 ft/minute draft. Flame spread is then monitored through observation windows along the side of the tunnel while concurrently monitoring smoke emissions through photocells installed within the exhaust duct. This is a severe test that to date has been passed by communication cables using premium materials such as low smoke materials, for example, Fluroethylenepropylene (FEP), Ethylenechlorotrifluoroethylene (ECTFE), or Polyvinylidene fluoride (PVDF), In general, cables meeting this test are approximately three times more expensive than a lower rated cable designed for the same application. However, communication cables failing this test must be installed within conduit, thereby eliminating the benefits of an economical, easily relocatable cable scheme.

In general, the manufacture of communication cables are well known, for example, U.S. Pat. No. 4,423,589, issued to Hardin et al. on Jan. 3, 1984 discloses a method of manufacturing a communications cable by forming a plurality of wire units by advancing groups of twisted wire pairs through twisting stations. Further, U.S. Pat. No. 4,446,689 issued to Hardin et al. On May 8, 1984 relates to an apparatus for manufacturing a communications cable wherein disc frames are provided with aligned apertures in which faceplates movably mounted. During operation, the faceplates are modulated in both frequency and amplitude.

The current materials for use in communications are also well known, for example, U.S. Pat. No. 5,001,304 issued to Hardin et al. on Mar. 19, 1991 relates to a building riser cable having a core which includes twisted pairs of metal conductors. Therein the insulating covers are formed from a group of materials including polyolefin. It should be noted however, that all of the insulating covers are the same and that the flame test used for riser cables is much less severe than the flame test used for plenum cables.

U.S. Pat. No. 5,024,506 issued to Hardin et al. on Jun. 18, 1991 discloses a plenum cable that includes non-halogenated plastic materials. The insulating material about the metallic conductors is a polyetherimide. Again the insulating material is the same for all of the conductors. Further, in U.S. Pat. No. 5,074,640 issued to Hardin et al. On Dec. 24, 1991 a plenum cable is described that includes an insulator containing a polyetherimide and an additive system including an antioxidant/thermal stabilizer and a metal deactuator. As is the convention, the insulator is the same for all of the metallic conductors.

U.S. Pat. No. 5,202,946 issued to Hardin et al. on Apr. 13, 1993 describes a plenum cable wherein the insulation includes a plastic material. The insulation is the same for all of the conductors within the plenum cable. European Patent 0 380 245 issued to Hardin et al. describes another plenum cable having insulation about the metallic conductors that, in this case, is a plastic material including a polyetherimide. As is the convention the insulation is the same for all of the conductor.

Further, U.S. Pat. No. 4,491,729 describes a cable that is intended as a low hazard cable. This patent describes a cable that includes a non-halogenated plastic material. Similarly, U.S. Pat. No. 4,969,706 describes a cable that includes both halogenated and non-halogenated plastic materials. In both patents the insulating material about the twisted pairs of conductors is the same for each cable.

U.S. Pat. No. 4,412,094 issued to Doughrety et al. on Oct. 25, 1983 relates to a riser cable having a composite insulator having an inner layer of expanded polyethylene and an outer layer of a plasticized polyvinyl chloride. All of the conductors include the same composite insulator.

U.S. Pat. No. 4,500,748 issued to Klein on Feb. 19, 1985 relates to a flame retardant plenum cable wherein the insulation and the jacket are made from the same or different polymers to provide a reduced amount of halogens. This reference tries to predict, mathematically, the performance of cables within the Steiner tunnel. The method does not include fuel contributions or configurations of designs. Further, synergistic effects are not addressed. In each embodiment, the insulation is the same for all of the conductors.

U.S. Pat. No. 4,605,818 issued to Arroyo et al. on Aug. 12, 1986 relates to a flame retardant plenum cable wherein the conductor insulation is a polyvinyl chloride plastic provided with a flame retardant, smoke suppressive sheath system. As is common throughout the known communication cables the conductor insulation is the same for all of the conductors.

U.S. Pat. No. 4,678,294 issued to Angeles on Aug. 18, 1987 relates to a fiber optic plenum cable. The optical fibers are provided with a buffer layer surrounded by a jacket. The cable is also provided with strength members for ridigity.

U.S. Pat. No. 5,010,210 issued to Sidi et al. on Apr. 23, 1991 describes a non-plenum telecommunications cable wherein the insulation surrounding each of the conductors is formed from a flame retardant polyolefin base compound.

U.S. Pat. No. 5,162,609 issued to Adriaenssens et al. on Nov. 10, 1992 relates to a fire-resistant non-plenum cable for high frequency signals. Each metallic member has an insulation system. The insulation system includes an inner layer of a polyolefin and an outer layer of flame retardant polyolefin plastic.

U.S. Pat. No. 5,253,317 issued to Allen et al. on Oct. 12, 1993 describes a non-halogenated plenum cable including twisted pairs of insulated metallic conductors. The insulating material is a non-halogenated sulfone polymer composition. The insulating material is the same for all of the metallic conductors.

It can thus be understood that much work has been dedicated to providing not only communication cables that meet certain safety requirements but meet electrical requirements as well. Nevertheless, the most common communication cable that is in widest use today includes a plurality of twisted pairs of electrical conductors each having an insulation of FEP, which is a very high temperature material and possesses those electrical characteristics, such as, low dielectric constant and dissipation factor, necessary to provide high quality communications cable performance. However, FEP is quite expensive and is frequently in short supply.

Consequently, the provision of a communication cable for use in plenums but has a reduced cost and reduced use of FEP is highly desired.

SUMMARY OF THE INVENTION

Accordingly, it is one object of the present invention to provide a communication cable for use in a plenum which reduces the amount of FEP or other expensive materials and hence, reduces the cost of the communication cable.

This object is accomplished, at least in part by the a communication cable that has a first plurality of twisted pairs of electrical conductors having a first insulating material about each electrical conductor thereof and a second plurality of twisted pairs of electrical conductors having a second insulating material about each electrical conductor thereof.

In one particular aspect of the invention, the communication cable includes four twisted pairs of electrical conductors wherein the electrical conductor of three of the four pairs are insulated with a material that is a plenum rated material wherein the insulation of the electrical conductors of the fourth pair is a modified non-plenum rated insulation material. As used herein the phrase "plenum rated insulation" includes those materials that would allow a cable to pass standard industry plenum tests if it were used on all of the twisted pairs of electrical conductors of a cable. Correspondingly, the phrase "non-plenum rated" insulation includes those materials that would significantly contribute to a cable failing standard industry plenum tests if it were used on all of the twisted pairs of electrical conductors of a cable. Typically, these non-plenum materials provide too much fuel contribution to the flame test either through a low melting point or a high fuel content or a combination of these factors. Non-plenum materials may also contribute excessively to the smoke generation of the cable under test, thus rendering the cable unsuitable for plenum applications. In such a communication cable the insulation material can be an olefin which is a material usually reserved for use in non-plenum application, for example, in riser cables.

In another aspect of the invention, the communication cable includes a first plurality of twisted pairs of electrical conductors wherein the insulation material of each of the first plurality of twisted pairs of conductors is a material conventionally used in plenum cables. In this aspect of the invention, the communication cable also includes a second plurality of twisted pairs of conductors having an insulation that is different from the insulation of the first plurality of twisted pairs of electrical conductors. The number of pairs in the second plurality of twisted pairs being no greater than the number of twisted pairs of the first plurality of electrical conductors.

Other objects and advantages will become apparent to those skilled in the art from the following detailed description of the invention read in conjunction with the appended claims and the drawings attached hereto.

BRIEF DESCRIPTION OF THE DRAWING

The drawings, not drawn to scale, include.

DETAILED DESCRIPTION OF THE PREFERRED EMBODIMENT

Figure 1:
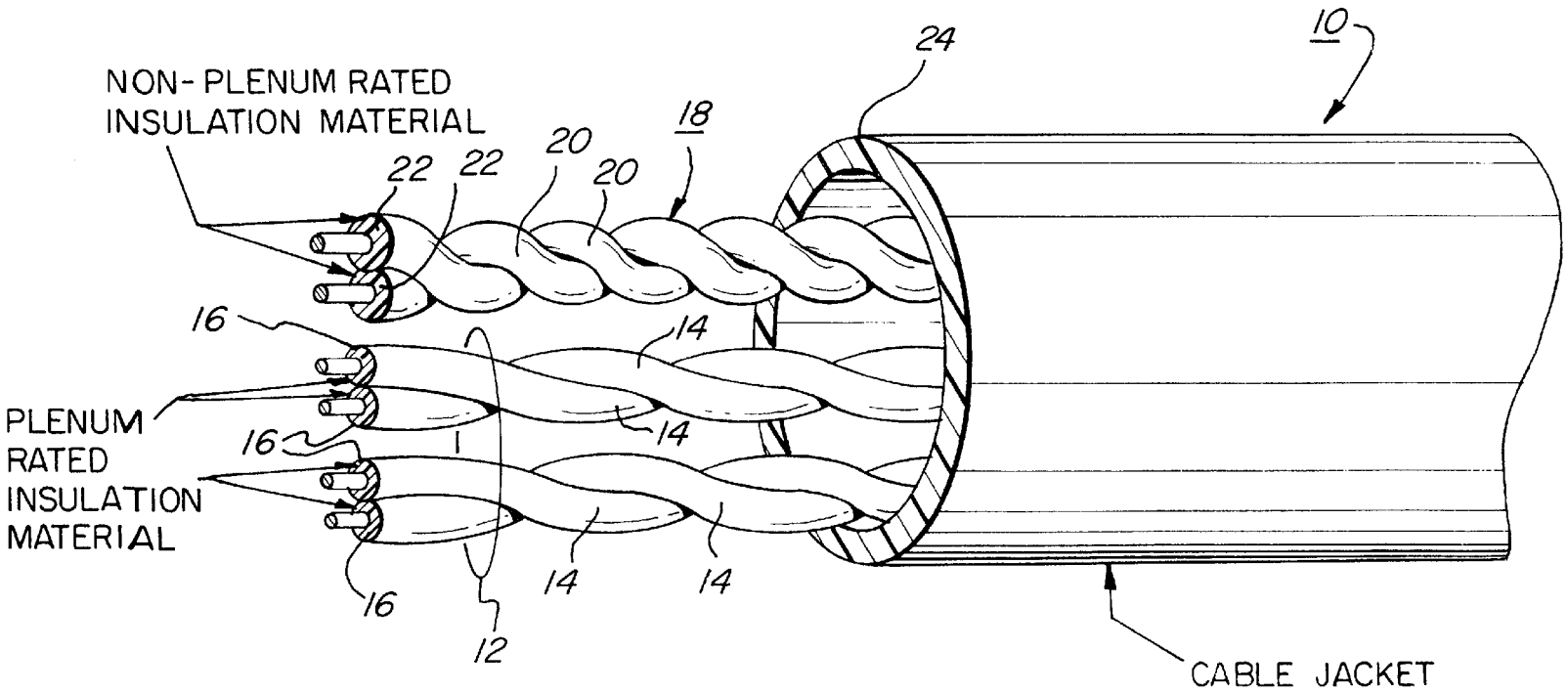
FIG. 1 which is a perspective view of a communication cable embodying the principles of the present invention.

A communication cable, generally indicated at 10 in FIG. 1 and embodying the principles of the present invention, includes a plurality of twisted pairs 12 of electrical conductors each member 14 of the twisted pairs 12 being surrounded by a layer 16 of insulation material and at least one other twisted pair 18 of electrical conductors each member 20 thereof surrounded by a layer 22 of insulation material that is different from the material of the layer 16 of insulation material of the twisted pairs 12. In one preferred embodiment, the plurality of twisted pairs 12 and the twisted pair 18 are surrounded by a cable jacket 24.

In one particular embodiment, each of the twisted pairs, 12 and 18, is provided with a twist length. In an embodiment wherein the communication cable 10 includes four twisted pairs, one or two of the twisted pairs are twisted pairs be having a layer 22 of insulation material different from the other twisted pairs 12 of electrical conductors.

In one specific embodiments, the communication cable includes three insulated twisted pairs 12 of electrical conductors each having a nominal diameter of about 0.034 inches. This includes an electrical conductor having a nominal diameter of about 0.0201 inches and a layer 16 of insulation having a thickness of about 0.0065 inches. For these twisted pairs 12 of electrical conductors the layer 16 of insulation can be any plenum rated insulation, such as, for example, FEP. In this embodiment, each of the insulated twisted pair 18 of electrical conductors has a nominal diameter of about 0,205 inches and a layer 22 of insulating material having a thickness of about 0.0085 inches.

Preferably, the layer 22 of insulation material of the twisted pair 18 is a modified non-plenum material. For example, such an insulation material 22 may be a combination of highly brominated and antimony trioxide filled high density polyethylene (HDPE) combined with standard HDPE. As another example, the insulation layer 22 may also be a hydrated mineral filled polyolefin copolymer blended with HDPE. Although other combinations can be used it is preferred that the combination is blended at a 50/50 to 75/25 blend ratio of the flame retarded HDPE to the standard HDPE. Such combinations improve the flame retardancy and smoke suppression of the material as well as reduces the fuel load by removing HDPE while maintaining electrical performance. Two such cables have successfully passed the Steiner tunnel test.

It has also been found that such a configuration does not compromise the desired electrical performance of the communication cable 10 due to the very good electrical and mechanical properties of the base olefin material. In fact, for the embodiment discussed above, the standard FEP four pair cable has a weakness in the typical design in that the twisted pair having the shortest twist length, i.e., the tightest twist, generally approaches the signal attenuation failure limit. Usually this is within about 2% of the passing level. Hence, any process changes must be limited on this twisted pair to avoid any distortional stresses during manufacture that would lower the characteristic impedance of the twisted pair and thus raise the signal attenuation. It has been found that when this twisted pair is provided with the modified olefin insulation material the signal attenuation is improved due to the added ruggedness of olefin material compared to the standard FEP insulation.

In the preferred embodiment, the communication cable 10 includes a cable jacket 24 that encases the plurality of twisted pairs 12 and the at least one twisted pair 18. Preferably, the cable jacket 24 is formed from Ethylene-Trichlorofluoroethylene (E-CTFE). Although the E-CTFE is preferred, other material, such as, for example, polyvinylchloride (PVC) or polymer alloys have also passed the modified Steiner tunnel test and may also be used.

Figure 2:
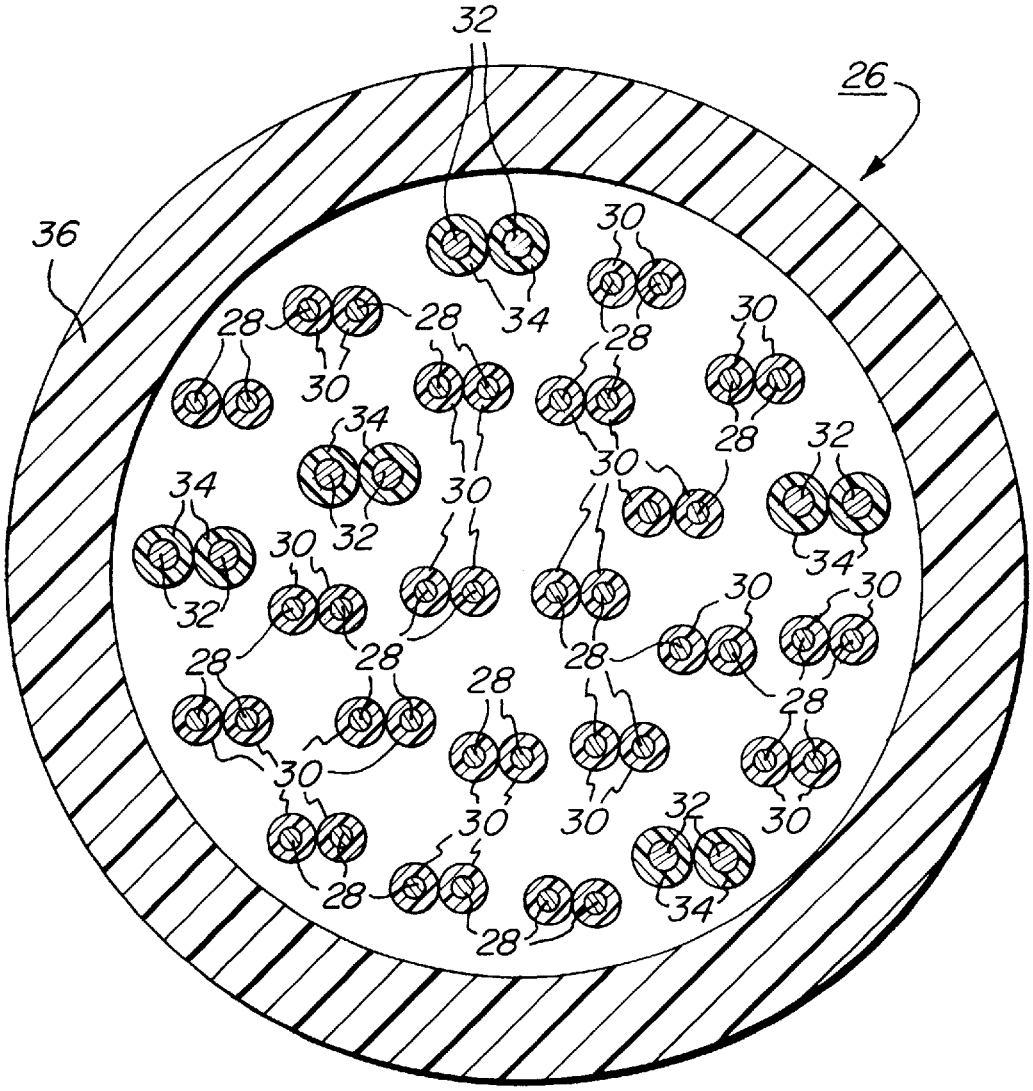
FIG. 2 which is an end view of another communication cable also embodying the principles of the present invention.

Another communication cable, generally indicated at 26 in FIG. 2 and embodying the principles of the present invention, includes a first plurality of twisted pairs 28 of electrical conductors having a first insulating material 30 about each electrical conductor thereof and a second plurality of twisted pairs 32 of electrical conductors having a second insulating material 34 about each electrical conductor thereof. Further, the second plurality of twisted pairs 32 is no greater than half of the total number of twisted pairs. For example, in a typically communication cable 26 wherein there is a total of about 25 twisted pairs of electrical conductors no more than twelve will constitute the second plurality of twisted pairs 32. The communication cable 26 also includes a cable jacket 36 that encases the first and second plurality of twisted pairs, 28 and 34, respectively. The cable jacket 36 is similar to the cable jacket 24 of the communication cable 10 previously described hereinabove and can be formed of the same materials.

Although the present invention has been discussed with respect to one or more specific embodiments it will be understood that other configurations and arrangements may be used which do not exceed the spirit and scope hereof. Hence, the present invention is limited only by the appended claims and the reasonable interpretation thereof.

What is claimed is:

1. A communication cable for use in a plenum, said cable comprising:

a plurality of twisted pairs of electrical conductors, each electrical conductor of said plurality of twisted pairs having a *single* surrounding layer of electrical insulation, *said single surrounding layer of electrical insulation of each electrical conductor of said plurality of twisted pairs being* formed from [a first material] *fluoroethylenepropylene* (*FEP*);

at least one additional twisted pair of electrical conductor, each electrical conductor of said at least one additional twisted pair having a *single* surrounding layer of electrical insulation, *said single surrounding layer of electrical insulation of each electrical conductor of said at least one additional twisted pair being* formed from [a second material, said second material being different from said first material] *an olefin*.

[2. The communication cable as claimed in claim 1 wherein said first material is a plenum rated insulation material.]

[3. The communication cable as claimed in claim 2 wherein said second material is a modified non-plenum rated insulation material.]

[4. The communication cable as claimed in claim 1 wherein said second material is a modified non-plenum rated insulation material.]

[5. The communication cable as claimed in claim 4 wherein said second material is an olefin.]

6. The communication cable as claimed in claim 1 wherein said [second material] *olefin* is a highly brominated and antimony trioxide filled HDPE blended with HDPE.

7. The communication cable as claimed in claim 6 wherein said blend is at a 50/50 ratio.

8. The communication cable as claimed in claim 6 wherein said blend is at a 75/25 ratio.

9. The communication cable as claimed in claim [6] *1* wherein said [second material] *olefin* is a hydrated mineral filled polyolefin copolymer HDPE *blended with HDPE*.

10. The communication cable as claimed in claim 9 wherein said blend is at a 50/50 ratio.

11. The communication cable as claimed in claim 9 wherein said blend is at a 75/25 ratio.

12. The communication cable as claimed in claim 1, further comprising:

a cable jacket, said cable jacket encasing said plurality of twisted pairs and said at least one additional twisted pair.

13. The communication cable as claimed in claim 12 wherein said cable jacket is formed from ethylene-trichlorofluoroethylene.

14. The communication cable as claimed in claim 12 wherein said cable jacket is formed from a polymer alloy.

15. The communication cable as claimed in claim 12 wherein said cable jacket is formed from polyvinylchloride.

16. The communication cable as claimed in claim 1 wherein said plurality of twisted pairs and said at least one additional twisted pair of electrical conductors have different twist lengths.

17. The communication cable as claimed in claim 16 wherein said at least one additional twisted pair has the shortest twist length.

[18. The communication cable as claimed in claim 17 wherein said second material includes an olefin base.]

19. The communication cable as claimed in claim [18] *17* wherein said [second material] *olefin* is a highly brominated and antimony trioxide filled HDPE.

20. The communication cable as claimed in claim [18] *17* wherein said [second material] *olefin* is a hydrated mineral filled polyolefin copolymer HDPE.

21. A communication cable for use in a plenum, said communication cable comprising:

a first plurality of twisted pairs of electrical conductors having a [first] *single layer of* insulating material about each electrical conductor thereof, *said single layer of insulating material about each electrical conductor of said first plurality of twisted pairs being fluoroethylenepropylene* (*FEP*); and a second plurality of twisted pairs of electrical conductors having a [second] *single layer of* insulating material about each electrical conductor thereof, *said single layer of insulating material about each electrical conductor of said second plurality of twisted pairs including an olefin base and* said second plurality of twisted pairs making up no more than half the total number of twisted pairs of electrical conductors.

[22. The communication cable as claimed in claim 21 wherein said first material is a plenum rated insulation material.]

[23. The communication cable as claimed in claim 22 wherein said second material is a modified non-plenum rated insulation material.]

[24. The communication cable as claimed in claim 21 wherein said second material is a modified non-plenum rated insulation material.]

[25. The communication cable as claimed in claim 24 wherein said second material includes an olefin base.]

26. The communication cable as claimed in claim 21 wherein said [second] *olefin based insulating* material is a highly brominated and antimony trioxide filled HDPE.

27. The communication cable as claimed in claim 21 wherein said [second] *olefin base insulating* material is a hydrated mineral filled polyolefin copolymer HDPE.

28. The communication cable as claimed in claim 21, further comprising:

a cable jacket, said cable jacket encasing said first plurality of twisted pairs and said second plurality of twisted pairs.

29. The communication cable as claimed in claim 28 wherein said cable jacket is formed from ethylene-trichlorofluoroethylene.

30. The communication cable as claimed in claim 28 wherein said cable jacket is formed from a polymer alloy.

31. The communication cable as claimed in claim 28 where said cable jacket is formed from polyvinylchloride.

32. The communication cable as claimed in claim 21 wherein said first plurality of twisted pairs and said second plurality of twisted pairs of electrical conductors have different twist lengths.

33. The communication cable as claimed in claim 32 wherein said second plurality of twisted pairs include the shortest twist lengths.

*34. The communication cable as claimed in claim 1 wherein said olefin is a hydrated mineral filled polyolefin in copolymer HDPE.*

*35. The communication cable as claimed in claim 34 wherein said plurality of twisted pairs and said at least one additional twisted pair of electrical conductors have different twist lengths.*

*36. A communication cable for use in a plenum, said communication cable comprising:*

*a first plurality of twisted pairs of electrical conductors having a single layer of insulating material about each electrical conductor thereof, said single layer of insulating material about each electrical conductor of said first plurality of twisted pairs being formed from a first material; and*

*a second plurality of twisted pairs of electrical conductors having a single layer of insulating material about each electrical conductor thereof, said single layer of insulating material about each electrical conductor of said second plurality of twisted pairs being formed from a second material including an olefin base, and said second plurality of twisted pairs making up no more than half the total number of twisted pairs of electrical conductors.*

* * * * *